United States Patent [19]

Gaudfrin

[11] Patent Number: 4,789,474

[45] Date of Patent: Dec. 6, 1988

[54] FILTER FOR LIQUIDS LADEN WITH SOLID PARTICLES, AND A FILTER INSTALLATION INCLUDING SUCH A FILTER

[76] Inventor: Guy Gaudfrin, Allée du bec de Canard. Golf., 78860 Saint-Nom-la-Breteche, France

[21] Appl. No.: 917,489

[22] Filed: Oct. 10, 1986

[30] Foreign Application Priority Data

Oct. 17, 1985 [FR] France .................. 85 15428

[51] Int. Cl.$^4$ .................. B01D 29/16; B01D 29/38
[52] U.S. Cl. .................. 210/333.01; 210/345; 210/346; 210/411; 210/451; 210/486
[58] Field of Search .................. 210/331, 332, 333.1, 210/333.01, 339, 340, 345, 346, 411, 486, 487, 493.3, 498, 451, 477

[56] References Cited

U.S. PATENT DOCUMENTS

| 2,540,362 | 2/1951 | Winslow et al. | 210/486 |
| 2,570,132 | 10/1951 | Koupar | 210/411 |
| 2,612,236 | 9/1952 | Vedder | 183/58 |
| 2,788,901 | 4/1957 | Boeddinghaus et al. | 210/486 |
| 3,124,441 | 3/1964 | Rivers | 210/486 |
| 3,143,503 | 8/1964 | Schmidt | 210/461 |
| 3,354,620 | 11/1967 | Scholl | 55/304 |
| 3,563,038 | 2/1971 | Healy et al. | 210/486 |
| 3,659,718 | 5/1972 | Brociner et al. | 210/486 |
| 3,679,061 | 7/1972 | Davis | 210/331 |
| 3,977,975 | 8/1976 | Geurtsen | 210/333.01 |
| 4,111,806 | 9/1978 | Wright et al. | 210/333.01 |

FOREIGN PATENT DOCUMENTS

413814 11/1967 Australia .
895145 11/1958 Fed. Rep. of Germany .
760272 10/1956 United Kingdom .

*Primary Examiner*—Benoit Castel
*Assistant Examiner*—Richard D. Jordan
*Attorney, Agent, or Firm*—Lewis H. Eslinger; Jay H. Maioli

[57] ABSTRACT

A filter (51) for liquids comprises a filter vat (52) having an inlet orifice (60) for the liquid to be filtered, an outlet orifice (58) for the filtrate, and an evacuation orifice (66) for solid particles, together with filter elements comprising filter medium cloths disposed vertically around filter leaves (18) inside said vat between said inlet and outlet orifices. Said cloths (12) are in the shape of elongate pockets (16) threaded freely over said leaves (18), said leaves being provided with longitudinal drainage channels (32), said pockets having openings (19) in communication with said outlet orifice (58), and said filter leaves (18) being suspended beneath supports (20) which are fixed inside said vat (52), with said leaves being free to rock sideways from their supports.

27 Claims, 8 Drawing Sheets

FILTER FOR LIQUIDS LADEN WITH SOLID PARTICLES, AND A FILTER INSTALLATION INCLUDING SUCH A FILTER

The present invention relates to a filter for liquids laden with solid particles, i.e. for filtering liquid suspensions of particles, and to a filter installation including one or more such filters.

BACKGROUND OF THE INVENTION

In numerous industries, residues or solid particles present in a liquid are being separated from the liquid more and more often by filtering rather than by sedimentation which requires voluminous installations and excessively long settling times, and rather than by centrifuging which does not achieve the desired degree of separation and which is made expensive by the necessary energy consumption and maintenance.

Although filtering is based on a simple principle, namely causing a liquid to pass through a filter medium having orifices which allow the liquid to pass but which prevent the particles from passing, many difficulties are encountered in practice.

Firstly, the resistance to liquid flow is due not only to the filter medium itself but also to the layer of particles which accumulate thereon (commonly referred to as filter "cake"), and this requires a certain pressure to be applied to the liquid by means of pumps which consume increasing amounts of energy as the required pressure increases. Naturally the cake is removed periodically once it has reached a certain thickness, so as to ensure that the resistance due to the cake has an acceptable average value.

The cake may be removed by reversing the flow of the liquid either under pressure or merely under gravity, with a portion of the filtered liquid or "filtrate" passing back through the filter medium, thereby loosening the cake which falls under its own weight to the bottom of the filter-containing vat, from which it is evacuated.

This method of proceeding requires a portion of liquid which has already been filtered to be filtered again and this may constitute a considerable expense. It may also be observed that when the accumulated solid material is to be removed, it is accompanied under these circumstances by a considerable quantity of liquid which needs to be removed subsequently, thereby increasing the cost of the process overall.

Naturally, while the cake is being removed, filtering is interrupted for a period of time which varies depending on the difficulties encountered. Although the major portion of the cake comes loose without much difficulty, zones or plates of cake which are relatively firmly attached to the filter medium may remain so that back-washing must be continued for long enough to loosen these difficult plates. Although they can be removed by auxiliary methods, such as emptying the vat and spraying a liquid jet onto the cake, or shaking the filter surfaces, or back-washing at high pressure, such methods are relatively "violent" and may damage the separating power of the filter medium by applying stresses thereto and by damaging its surface layer, and in any event they require rather long periods of interruption.

When returning to filtering after back-washing, even if relatively "gentle" methods have been used for removing the cake, the initial resistance to liquid flow is very low and the liquid consequently passes through the medium very fast, and as a result it undesirably entrains fine solid particles through the filter medium. The initial filtrate must therefore be recycled, and this must also be taken into account in determining the total time for which the filtering activity of an installation is interrupted.

It follows from above that the real time during which a filter installation is effectively operating as a filter is considerably less than the total time it is in operation.

It may also be observed that filter installations are particularly compact because it is possible to juxtapose a very large number of filter medium surfaces in a common filter vat. However, such a compact structure is not without its own drawbacks. The spaces between the filter surfaces are very narrow and under some unexpected or accidental circumstances solid material may accumulate therebetween and form bridges which push against facing filter surfaces. This may damage the filter surfaces and it is also practically impossible to remove a bridge-forming cake of solid material without interrupting operation of the installation and removing it manually. Such bridges are bound to occur sooner or later.

One particular "unexpected" circumstance worth mentioning here is that it may be necessary to filter liquids in which the concentration of solid material is likely to vary unexpectedly and to give rise, accidentally, to such bridges.

SUMMARY OF THE INVENTION

In order to mitigate these drawbacks, the present invention provides a filter for liquids laden with solid particles, the filter comprising a filter vat provided with an inlet orifice for the liquid to be filtered, an outlet orifice for the filtered liquid or filtrate, and an evacuation orifice for solid particle sludge, together with a plurality of filter elements in the form of filter medium cloths disposed around filter leaves and arranged substantially vertically in said filter vat between said inlet and outlet orifices, the filter including the improvement whereby said filter medium cloths are shaped as elongate pockets which are fitted substantially freely over said leaves, said leaves being provided with longitudinally-extending drainage channels, said pockets having openings directed upwardly and in communication with said outlet orifice, and said leaves being suspended beneath support members fixed in said vat and being free to rock sideways.

The invention also provides a filter installation incorporating such a filter, said installation comprising a feed tank for holding liquid to be filtered, said tank being situated at a lower level than the filter, a feed pump having its suction side connected to said feed tank and having its exhaust side connected to the inlet orifice of the filter, a buffer tank for the filtrate connected to said outlet orifice and situated at a higher level than the filter elements, a sludge-receiving tank fitted to said evacuation orifice via an evacuation valve, and a decompression pipe connecting the feed tank with a filter decompression orifice having its inlet situated above the filter elements, with a decompression valve being mounted in said decompression pipe.

Preferably, in a filter installation of this type, said filter vat includes a top cover whose height is chosen in such a manner as to trap a given volume of air in the top of the vat.

Also, a leveling duct may be provided between the filter vat and the feed tank, said duct being controlled by a leveling valve and having its inlet situated at a level between the outlet from the inlet orifice and the inlet to the decompression orifice.

BRIEF DESCRIPTION OF THE DRAWINGS

Embodiments of the invention are described by way of example with reference to the accompanying drawings, in which.

MORE DETAILED DESCRIPTION

The following description begins with the structure of a filter per se, and then continues with the structure of a filter installation including such a filter.

Figure 1:
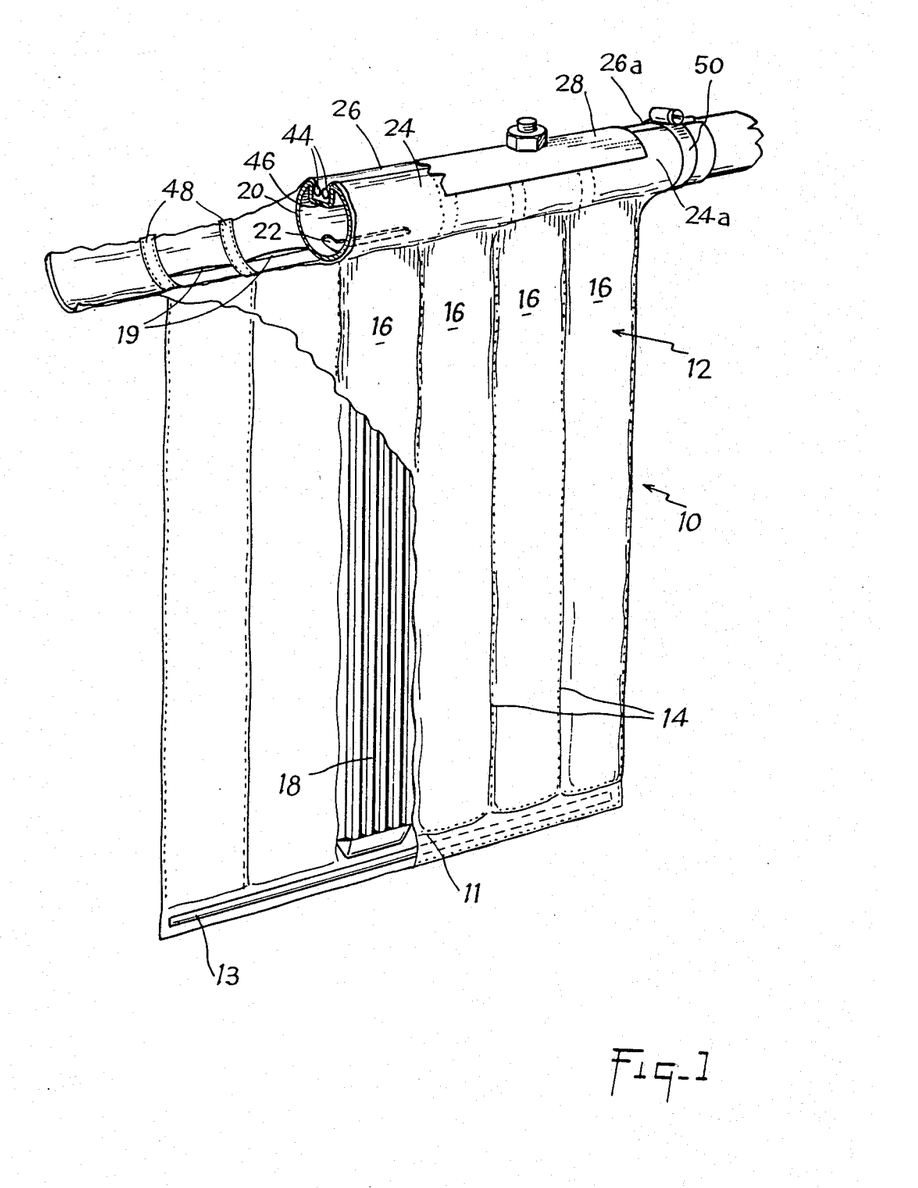
FIG. 1 is a partially cutaway perspective view of a filter element belonging to a filter in accordance with the invention.

The filter comprises a plurality of identical filter elements, or filter elements which are at least made in accordance with the same principles, as shown in FIG. 1.

Each filter element 10 comprises a filter cloth 12 which is folded or closed at 11 and which is subdivided by stitching 14 running perpendicularly to the fold or closure 11 to constitute a plurality of juxtaposed pockets 16. Each pocket has a filter leaf 18 inserted therein, and said filter leaf also serves as a drain for the filtered liquid or "filtrate", after it has passed through the cloth from the outside to the inside of the pockets.

With reference to the vertical orientation of the filter elements when they are installed in a filter, it may be observed that the pockets are closed at their bottom ends, and that thay are open at their top ends 19 where they communicate with a manifold 20.

To this end, the manifold tube has openings 22 which are regularly distributed along a bottom generator line thereof, and the top edges 24 and 26 of the cloth 12 which are not involved with the vertical lines of stitching are pressed against the walls of the tube by means of a retaining plate 28 in the form of an upsidedown gutter, thereby preventing any direct communication between the volume outside the filter cloth and the passage inside the manifold.

Figure 2:
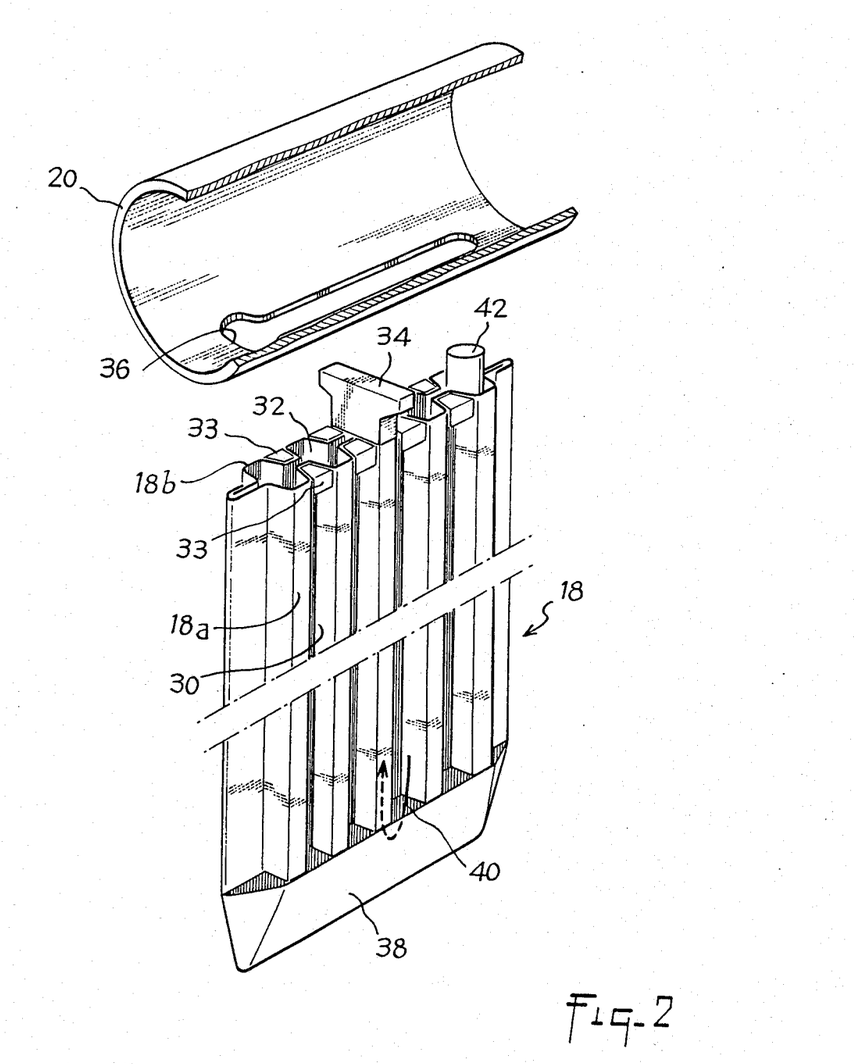
FIG. 2 is a perspective view of a filter leaf included in the FIG. 1 filter element and illustrating the manner in which it is assembled to a manifold.

As shown in FIG. 2, the filter leaves 18 inserted into the pockets are in the form of corrugated metal or plastic plates 18a and 18b whcih are assembled or connected back-to-back by any suitable technique so as to define internal drainage channels 32 and external drainage channels 30 between the corrugations. The various dimensions of these leaves, i.e. their thickness, width, and length, are such that they may be inserted substantially freely into the pockets without putting the cloth 12 under any particular tension.

The top ends of the leaves are provided with suspension cleats 34 which co-operate with keyhole-type slots 36 running along the bottom of the manifold 20 for the purpose of suspending the leaves directly from the manifolds and thus avoiding suspending them from the cloth which could cause the cloth to stretch under the weight of the leaves. The manifold thus constitutes a leaf support, in addition to constituting a filter cloth support.

This cleat-type suspension (or any other analogous mode of suspension replacing it) allows the filter element to rock freely where it hangs below the manifold, with advantages which are explained below.

Advantageously, the cleat-receiving keyhole slots 36 are constituted by the same holes through the manifold as the openings 22 providing communication between the manifold and the inside of the filter cloths, thereby simplifying manifold design.

In order to improve the rigidity of the leaf assembly, stiffeners 13 are place horizontally along the bottom edges of the filter cloths, and are held therein by being stitched in place around their entire peripheries.

The bottom end of each filter leaf has a protective cover 38 in the form of a V-shaped plate for the combined purposes of providing a bearing surface which is continuous and substantially smooth for the bottom fold in the cloth, and also for providing internal communication between the external drainage channels 30 round the leaf and the internal drainage channels 32 inside the leaf, as symbolized by arrow 40.

Various other construction details may be observed, for example the suspension cleats 34 are crimped and/or welded or brazed to the inside of one of the internal drainage channels, and preferably to the middle drainage channel of each filter leaf, or else they may be fixed between channels in order to avoid blocking one of the internal channels 32; an antipivoting peg 42 is provided on the top edge of the filter leaf at an offset from the suspension cleat and suitable for engaging in an opening in the manifold in order to prevent the filter leaf from pivoting about its middle axis.

Advantageously, plugs 33 are provided to close the top ends of the external channels 30 in order to cause the liquid to flow downwardly along the external channels, for reasons which are explained below.

As shown in FIG. 1, braids 44 are preferably provided along the top margins of the filter cloth for clamping in a groove 46 running along the top of the manifold. The manifold has been omitted from the left-hand side of the figure, thereby showing reinforcing strips 48 sewn to the margins 24 and 26 of the filter cloth in line with the vertical stitching 14 in order to reinforce the cloth at the top ends of said stitching.

To the right-hand side of the figure it can be seen that the top margins 24 and 26 of the filter cloth extend sideways, and that these lateral extensions 24a and 26a are pressed in sealed manner against the manifold by means of clamping collars 50, or by any other equivalent binder means.

A complete filter 51 comprises a plurality of filter elements 10 of the type described above disposed either in parallel (see FIGS. 3 and 4) or else in a star configuration (see FIGS. 5 and 6) inside a filter vat 52 which is generally cylindrical in shape having a conical bottom 54 and a part spherical top cap 56. The manifolds 20 of the filter elements are connected to an outlet manifold 58 situated outside the vat, with each of the filter element manifolds passing through the walls of the vat in sealed manner.

Optionally (see FIGS. 5 and 6), the vat 52 may include a length 53 which is capable of being disassembled from the remainder of the vat and which extends between the conical bottom 54 and the part-sherical cap 56, with the filter elements 10 being fixed on said length together with their manifolds 20 and the outlet manifold 58. It is then easy to remove the entire assembly of filter elements without disassembling the vat assembly (other than its cover). This arrangement makes it possible to rapidly replace an entire filter element assembly with a spare assembly, if necessary.

In a variant, not shown, the cylindrical vat is disposed horizontally and the filter elements are inserted therein through a side window which is closed by a closure plate. The filter elements inside are disposed vertically as in the previous case. This variant is to be recommended when only limited space is available in the vertical direction.

Figure 3:
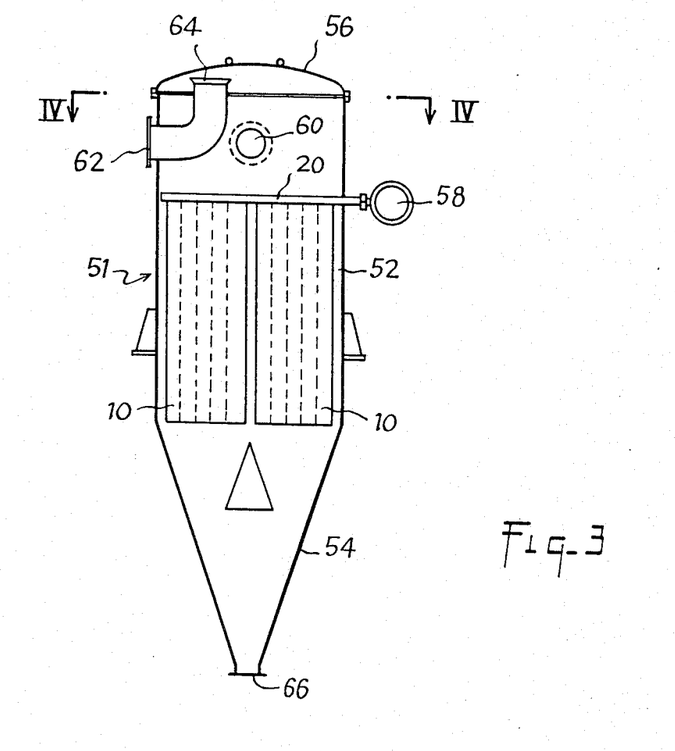
FIGS. 3 and 4 are a vertical and a horizontal section respectively through a filter in accordance with the invention.
Figure 4:
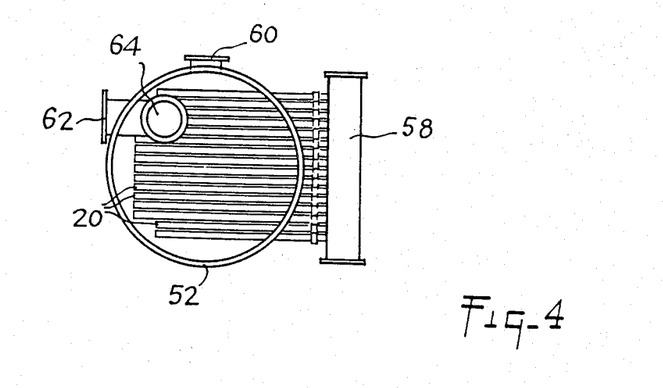

The filter element manifolds are fixed (preferably releasably) inside the vat at substantially the same level so as to leave a predetermined safety margin below the top of the vat, for reasons which are explained below.

The vat also includes an inlet orifice 60 which opens out above the level of the filter element manifolds, and which is connected to the outlet side of a feed pump for the liquid to be filtered. There is also a decompression orifice 64 situated at the top of the vat and opens out from the vat into the inlet tank of the feed pump and a waste orifice 66 for sludge at the bottom end of conical portion 54 of the vat 52.

In a variant, when the set of filter elements is mounted on a dismountable length of vat 53 (see FIGS. 5 and 6), the inlet orifice 60 and the decompression orifice 64 are fed in through the bottom portion of the vat and are connected to their respective inlets via ducts 61 and 63 passing vertically along the center of the vat. This avoids the need to disconnect the pipework when the top cover is removed.

Figure 7:
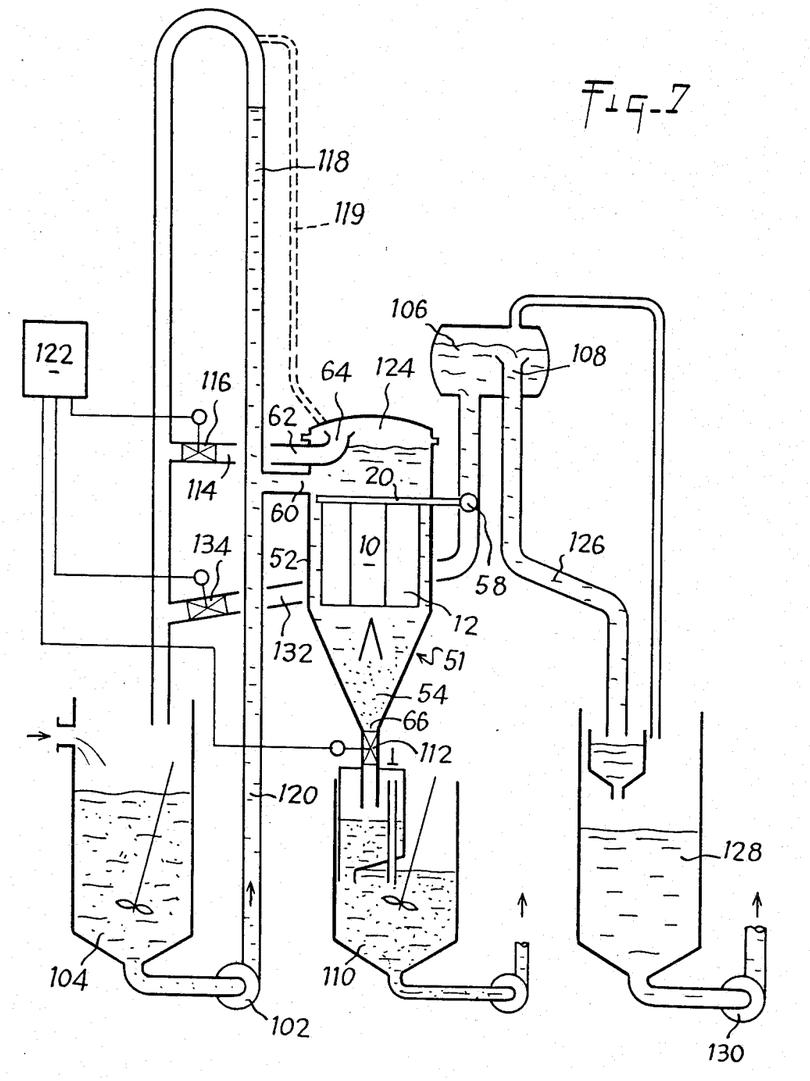
FIG. 7 is a diagram of a filter installation including a filter in accordance with the invention.

The simplest version of a filtering installation including a filter as described is shown in FIG. 7, and it comprises a filter 51, a feed pump 102 which takes liquid to be filtered from a tank 104 situated beneath the filter 51 and which outputs said liquid into the vat 52 of the filter via its inlet orifice 60, a buffer tank 106 which is connected to the outlet manifold 58 and which is placed at a higher level than the filter element manifolds 20, an overflow pipe 108 for removing filtrate from the buffer tank 106, a sludge-receiving tank 110 which is in connection with the evacuation orifice via a controlled evacuation valve 112, a decompression duct 114 connecting the decompression orifice 62 to the tank 104 and fitted with a controlled decompression valve 116; and finally a balancing pipe 118 connected as a branch from the outlet duct 120 of the pump and rising to a height which is not less than the pump outlet pressure (expressed as a column of liquid).

This installation is controlled from a control box 122 which acts essentially on the evacuation valve 112 and on the decompression valve 116, given that the feed pump 102 can operate continuously throughout the operating sequence, as explained below.

Taking established filtering conditions as the starting point for describing the operation of the installation (see FIG. 7), both the evacuation valve 112 and the decompression valve 116 are closed, the vat 52 is full of liquid to be filtered (apart from a small quantity of air 124 trapped under the top cover of the vat), and the equilibrium tube 118 is full of liquid up to a substantially stable height corresponding to the outlet pressure from the pump 102. The liquid passes through the filter cloth 12 and solid particles in suspension accumulate thereon, thereby progressively building up a filter "cake". The liquid clarified by passing through the filter cloth enters into the pockets and flows along the external drainage columns of the leaves, partially upwardly to the tops of the pockets, and partially downwardly to the bottom protective covers and then upwardly along the internal drainage channels to join the fraction which began by moving upwardly, with the entire filtrate flow then running through the openings into the filter element manifolds 20 and thence to the outlet manifold 58 and finally reaching the buffer tank 106. The overflow pipe 108 keeps the level of filtrate in the buffer tank 106 at a constant height and the filtrate which escapes via the overflow pipe flows along a duct 126 to a tank 128 from which it is pumped by a pump 130 and fed to a utilization installation (not shown).

When the filtering stage is over, (which period may be determined in various different ways, for example by means of a timing device integrated in the control box or when the outlet pressure from the pump exceeds a predetermined threshold corresponding to the formation of a given thickness of filter cake on the filter cloth, or more generally still by means of an automatic device for optimizing operation on the basis of filtering laws and on the quantity of the suspension to be processed, which device may be constituted by circuitry including one or more microprocessors), the control box begins by opening the decompression valve 116, thereby causing the pressure in the vat 52 to drop more or less progressively, depending on the time required for emptying the equilibrium pipe 118. Naturally, this period depends on the volume of liquid contained in the equilibrium pipe 118, and thus on its diameter, and also on the diameter of the decompression duct 114 and its valve 116 which must be capable of allowing a rate of flow back to the tank 104 under the effects of gravity which is not less than the flowrate provided by the pump 102 when pumping without the increased back pressure of the liquid flow along the equilibrium tube 118. It may be observed that the feed pump 102 continues to operate during this period.

Given that the pressure in the vat drops to a value close to zero, filtering ceases.

Then the control box 122 opens the evacuation valve 112, allowing the liquid contained in the bottom 54 of the vat together with the sludge contained therein to escape. The sludge is constituted by the debris of filter cake which has been detached from the filter cloths 12 during the preceding cycle. At this stage of the operating cycle being described, the pressure drop inside the vat 52 and the presence of filtrate in the buffer tank 106 at a level higher than the level of the filter elements 10 cause back pressure to be set up from the inside to the outside of the pockets 16, together with a corresponding flow of filtrate. As a result, the cake of solid material accumulated on the filter cloth loosens and the debris therefrom is entrained by gravity towards the bottom 54 of the vat where it collects prior to being evacuated during the next cycle.

The cross-section of the evacuation valve 112 is selected to be such that the quantity of sludge and liquid contained in the vat may be evacuated in as short a period of time as possible so as to avoid lengthening the interruption time, said quantity being determined by the concentration to be obtained at the outlet. This quantity or volume of evacuated sludge and liquid lowers the level inside the vat 52 and partially or completely compensates the quantity of filtrate returned by the backwash plus the quantity of liquid delivered by the feed pump 102 during the same period.

There are several points worth observing:

During the above-described stage, the fact that the pump 102 is kept in operation (which is made possible by the shortness of the evacuation phase) makes it possible to keep the liquid level constantly above the filter elements 20. If this level falls so that the filter elements emerge partially from the liquid, the cake is loosened preferentially from the portions which have emerged to the detriment of the portions which remain immersed. Further, the turbulence provoked by the liquid arising through the inlet orifice only affects the top portion of the liquid situated above the filter elements, thereby avoiding breaking up the fragments of cake. Finally, since the pump is not stopped, there is no need to start it up again, thus avoiding the drawbacks associated with starting up a pump, including mechanical drawbacks (starting force), hydraulic drawbacks (transient pressure fluctuations, water hammer, cavitation), and electrical drawbacks (high starting currents), and that does not take into account the savings of avoiding a specific control stage in the control box 122 or the savings in electricity consumption.

Suppose that accumulations due to abnormal increase in the thickness of cake along contiguous filter elements have occurred during a filtering stage, the fact that the filter elements are mounted so that they can rock or swing freely ensures that the solid masses built up in this way cannot stabilize as thrust members between adjacent filter elements. In conventional filters where all of the filter cloths are tensioned over fixed supports, such accumulations invariably require the installation to be stopped for manual intervention. Very high forces can be developed by such accumulations and they can damage the filter media and their supporting leaves.

When the level of liquid in the buffer tank 106 has fallen far enough, the filtrate back pressure becomes practically nil and the flow of filtrate falls off progressively, thereby avoiding any disturbance to the thin limiting film of cake which adheres to the filter cloth 12. This limiting layer is constituted by an interfitting arrangement of solid particles of different sizes and its presence contributes to filter performance. If it is destabilized, passages through the filter cloth are reopened and fine solid particles can then pass therethrough when filtering is restarted.

Throughout the filtering stage, the differential pressure between the outside and the inside of the filter cloth pockets has the effect of pressing the cloth (and thus the cake of solid particles) against the filter leaves which thus directly and completely support the weight of the cake. The filter cloths therefore do not support the weight of the cake and therefore do not run any risk of being stretched thereby.

When passing from a filtering stage to a cake-removal stage by filtrate backwashing, the pockets tend to inflate somewhat. The total volume represented by this inflation of all of the pockets in the filter cloth constituting the filter is a "dead" volume in that the corresponding volume of filtrate returns to the buffer tank and does not contribute to the backflow. However, in this case, the cross-section of the filter leaf is very close to the sausage shape which the pockets take up when the filtrate is made to flow backwards, thereby ensuring that the dead volume is very small. In addition, the cloth is deformed very little and as a result the adjacent cake is deformed very little and therfore has little tendency to crack. The appearance of such cracks is disadvantageous insofar as they constitute preferential flow paths for the backflowing filtrate.

Throughout the backflow stage, a film of liquid is established which emerges through the cloths in a highly uniform and regular manner, thereby facilitating the loosening of the entire accumulated cake and thus preventing fragments of cake from hanging on here and there to the adjoining filter cloth as they fall between adjacent filter elements to the bottom of the vat. It is useful to recall in this respect, that the filter elements in question may be more than two meters high and at a spacing of a few centimeters.

At the end of this phase (which is terminated either by means of a timer device in the control box 122 or else by detecting the arrival of a predetermined level of sludge in the sludge-receiving tank 110), the control box 122 closes the evacuation valve 112 and then closes the compression valve 116 after enough time has elapsed to ensure that the level of liquid in the vat has risen to a level close to the inlet 64 to the decompression tube by evacuating the air enclosed in the top portion of the vat 52. Simultaneously, this time lapse allows the removed cake to move down to the bottom of the vat so as to avoid being re-applied against the filter cloths when filtering restarts.

The liquid pressure inside the vat then rises progressively until it reaches the nominal delivery pressure from the pump 102, with the pressure rise extending over the period of time required for the liquid to rise up the equilibrium pipe 118 to its previous level. For the filter elements 10, this has the effect of re-establishing the flow of liquid from the outside towards the inside of the pockets progressively, thus avoiding high filter speeds which could cause the finest solid particles to be entrained through the filters. The quality of filtering is thus practically constant from the moment filtering restarts, and there is no need to recycle the initial filtrate as is the case in conventional installations.

As for the filter elements themselves, the flow of filtrate downwardly along the external drainage channels and upwardly along the internal drainage channels ensures that the volumes situated at the bottom ends of the pockets are swept constantly, thereby preventing solid particles from accumulating therein. Given that filtering is never perfect, there are always some solid particles which pass through the filter and which can, in the end, accumulate along such a bottom end if the flow of filtrate is solely upwardly, given that the speed of flow at the bottom end is then substantially practically nil, by definition.

From the above description, it will be observed that the invention provides additional advantages.

In conventional installations, the sudden restarting of filtering gives rise to filtrate which is initially cloudy and which must be recycled. It is therefore advantageous to increase the duration of filtering stages even though the accumulated cake will be thicker, thereby requiring the filter elements to be disposed further apart and thus reducing the useful filter area within a given volume, and also requiring high outlet pressure pumps in order to overcome the increased head loss through the cake.

In contrast, the present invention provides short interruption periods, and great uniformity of backwash distribution within the filter elements, thereby allowing the thinnest of cake to be uniformly loosened, and it avoids the need to recycle the initial filtrate after restarting, all of which make it possible to operate with much shorter filtering stages. The cake thus remains much thinner and the filter elements can be moved closer together, thereby increasing the useful filter area within a given volume. In addition, the reduced head loss through the cake makes it possible to use pumps having a lower outlet pressure.

If, in spite of everything, it is still necessary to recycle the filtrate on restarting filtering, the volume which will need recycling will be very limited. Thus, the installation may be fitted, as indicated, with a recycling duct 132 for connecting the outlet manifold 58 to the feed tank 104, with said duct being fitted with a recycling valve 134 which is opened when filtering restarts, and more precisely when the evacuation valve 112 is closed. The recycling valve is then re-closed after a certain time delay, for example after a period of time sufficient to re-establish filtering pressure inside the vat or for re-establishing a predetermined fraction of said pressure.

These advantages give rise not only to reduced investment, but also to reduced energy consumption in operation.

During the filtering stage, bubbles of air or gas entrained in the suspension delivered by the feed pump 102 may collect at the top of the vat, and the quantity of such air or gas may be sufficient to begin passing through the filter cloths, thereby adversely effecting the filtering efficiency and encouraging the permanent blocking of the filter cloths.

To avoid this drawback, and as shown in dotted lines in FIG. 7, a filtering installation may be provided with a degassing pipe 119 connected to the top of the balancing pipe 118 so that the air or gas entrained with the suspension delivered by the feed pump can escape continuously rather than lowering the liquid level until it can escape via the filter elements. Advantage is thus taken of the balancing pipe to collect the liquids which are entrained by the air or gas escaping via the degassing pipe 119.

The invention makes it possible very simply to monitor the degree to which the filtering cloths have become clogged in order to determine a suitable moment for replacing them or for regenerating them (for example acid regeneration for cloths used for filtering carbonated syrups).

To this end, two liquid level probes are placed inside the buffer tank 106 and the time required for the level of the filtrate to pass from the upper probe to the lower probe is measured during the stages for which filtering is interrupted and the filtrate flows back into the filtering pockets in order to loosen the cakes of solid particles. Naturally, in order for this time to be genuinely representative of the degree of clogging, both probes are placed in the lower portion of the buffer tank since the drop in level in the top portion is essentially representative of the volume of filtrate necessary for inflating the pockets, and this has already been described as a "dead" volume.

For each cycle, variations in this time are compared either with a predetermined threshold duration or else with the time observed using new filter cloths.

Figure 8:
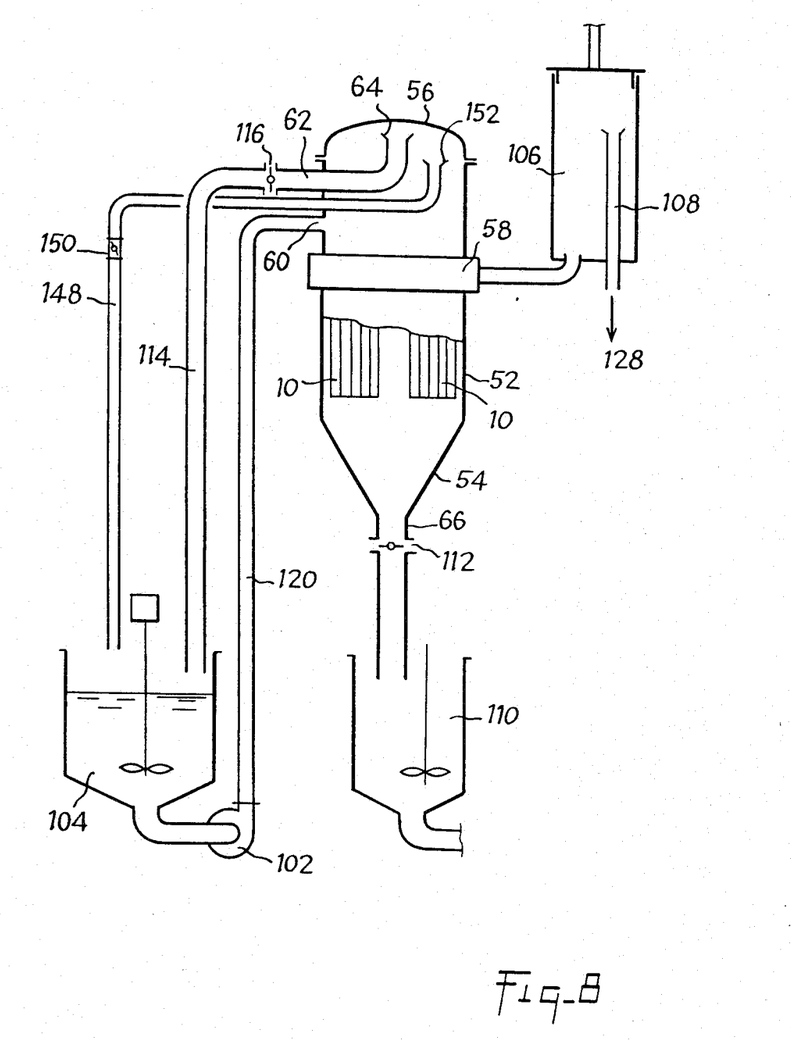
FIGS. 8 to 10 are diagrams showing variant filter installations.

In the variant shown in FIG. 8, the filter installation does not have a balancing pipe, but the top cover 56 of the vat is taller and the bottom of the buffer tank 106 is situated approximately at the same level as the manifolds 20 of the filter elements 10.

A progressive rise in pressure when filtering is restarted after the evacuation valves 112 and the decompression valve 116 have been closed is ensured by progressively compressing the volume of air trapped in the top of the vat. The decompression valve may be a valve of the type which opens and closes progressively. The pressure drop at the beginning of the sludge-dumping stage is made to be progressive by progressively opening the decompression valve. Alternatively, the decompression valve could be of the progressive-closing and rapid-opening type in order to decompress the filter in as short a period as possible so as to reduce the time for which filtering is interrupted.

In order to keep the quantity of air at the top of the vat constant, a leveling duct 148 is provided under the control of a valve 150, and the inlet 152 thereto is situated at a level between the inlet to the feed duct and the inlet to the decompression duct, with said leveling duct opening out into the feed tank.

This valve is opened during the filtering interruption stage, and this has the effect of keeping the volume of air between the top of the vat and the inlet to the leveling duct constant prior to the following filtering cycle starting. Naturally, this valve is closed before filtering is restarted, for example at the same time as the decompression valve is closed.

The disposition of the outlet manifold 58 outside the vat requires as many passages through the wall of the vat as there are filter element manifolds 20, however it does enable each connection between a filter element manifold and the outlet manifold to be provided by an inspection length made of transparent material together with an isolating valve.

Thus, if an abnormal quantity of solid particles appears in the filtrate, it is possible to rapidly determine which of the filter elements is faulty by visually inspecting the clarity or cloudiness of the filtrate passing through each of the inspection lengths, and then to isolate the (or each) faulty filter element by means of the corresponding isolation valve, thereby avoiding the need to recycle a large quantity of filtrate and enabling operation to continue practically without disturbance or loss of overall capacity until the next regular maintenance period.

Figure 5:
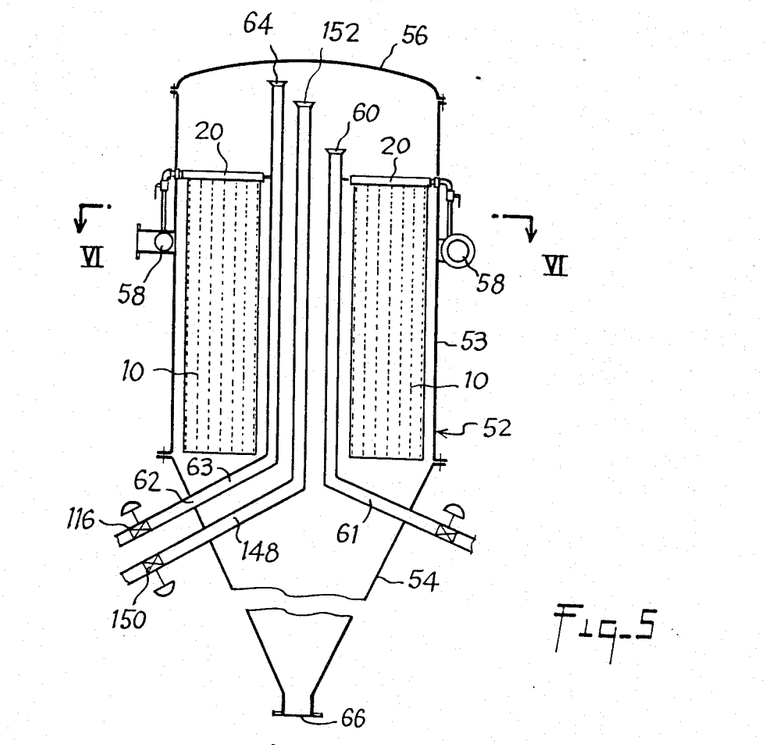
FIGS. 5 and 6 are analogous to FIGS. 3 and 4, being a vertical and horizontal section respectively through a variant filter.
Figure 6:
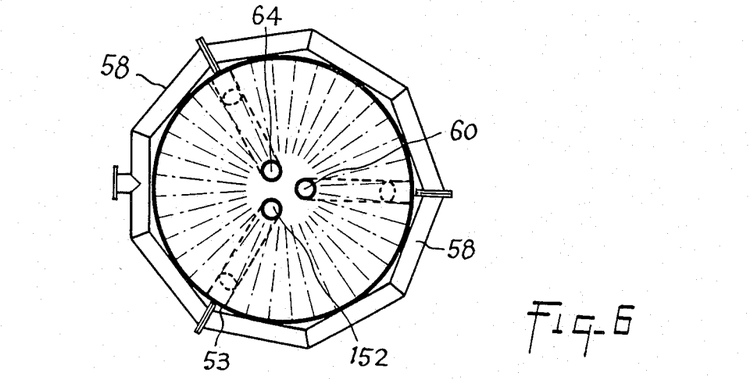

A different disposition (not shown) of the outlet manifold outside the vat could consist in placing it no longer below the filter element manifolds 20 as shown in FIG. 5, but above said manifolds. In this case, the outlet manifold 58 provides a pressure head on the filter elements, and if it is made to have sufficiently large capacity, it can advantageously replace the buffer tank 106 either completely or partially.

A different disposition may be provided in a variant which is preferably applicable to filters for which the filter elements are disposed in a star configuration, and in which the outlet manifold is disposed in the middle of the vat (not shown).

In this case, the duct connecting the outlet manifold to the buffer tank passes only once through the wall of the vat, thereby limiting sealing problems.

If the possibility of inspecting the clarity of the filtrate from each of the filter elements is still to be retained, each filter element manifold may be extended to the outside of the vat by a small diameter tube which passes through the wall of the tube and which terminates in a sampling valve. Should solid particles appear in the filtrate, samples of filtrate can be taken from each of the filter elements in order to determine which filter element(s) is (are) faulty.

Figure 9:
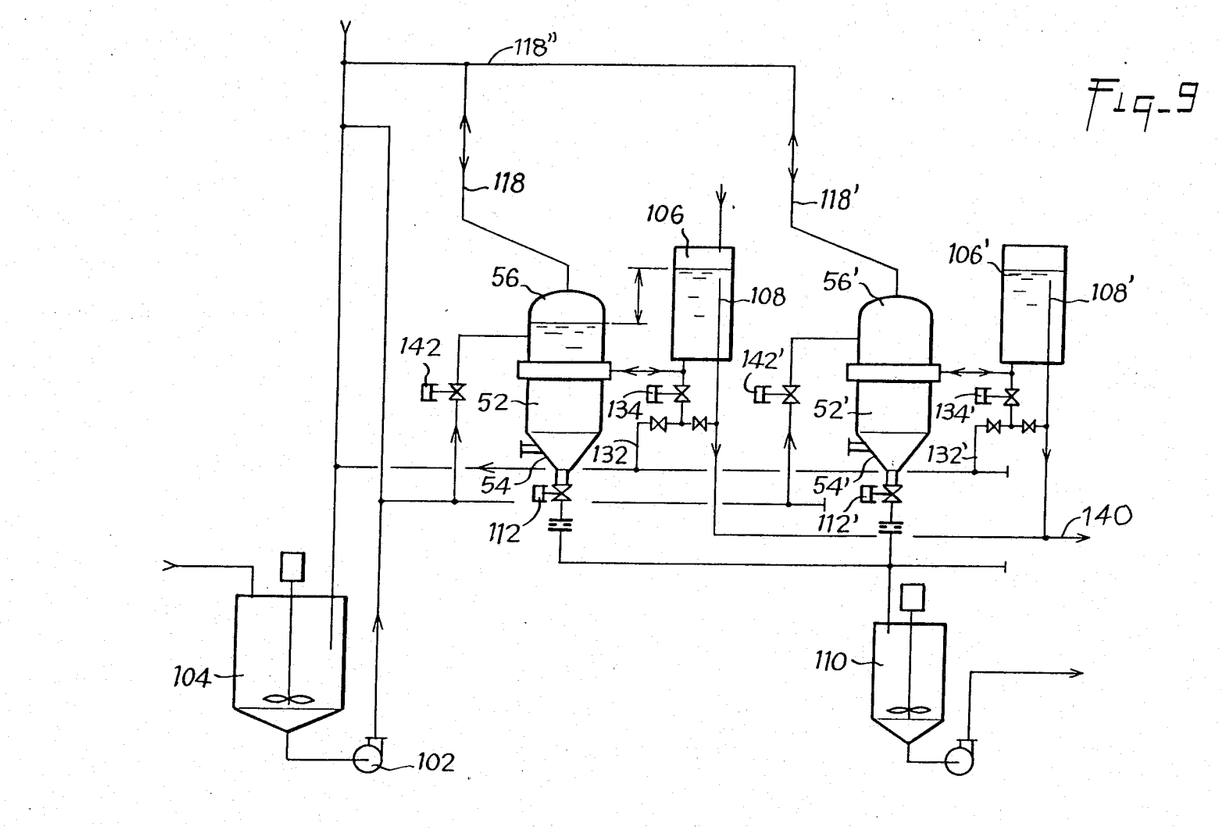

The variant shown in FIG. 9 is an installation including two filters which operate alternately, said filters being connected in parallel. Each of the filters 52, 52' is accompanied by a corresponding buffer tank 106, 106' and a corresponding balancing and de-gassing pipe 118, 118' together with a corresponding evacuation valve 112, 112'. However, they do not have decompression valves.

The two overflows 108 and 108' from the buffer tanks are connected to a common utilization duct 140, and the two evacuation valves open out into common sludge-receiving tank 110, and a single feed tank 104 and feed pump 102 feed both filter vats via respective feed valves 142 and 142' which are sequentially controlled by the control box.

Briefly, this control sequence consists in closing the feed valve 142 of the first vat 52 at the end of a filtering stage therefor, and in opening the feed valve 142' of the second vat 52' as soon as possible thereafter.

After closing the feed valve 142 of the first vat, the corresponding balancing pipe 118 empties progressively through the filter until filtering stops completely when the level therein has fallen to the vicinity of the level in the buffer tank 106. The evacuation valve 112 is then operated to evacuate the sludge accumulated in the bottom of the vat 54 and to loosen the cake by backwashing the filtrate through the filter elements.

The cross-section of the evacuation valve 112 and the length of time for which it is opened are determined in such a manner as to ensure that the level of liquid at the end of sludge-dumping is just above the level of the filter element manifolds in order to ensure that they are permanently immersed.

The evacuation valve 112 is then closed and the first filter 52 is thus ready to restart filtering once the filtering stage of the second filter 52' comes to an end and the positions of the feed valves 14 and 142' are inverted.

Advantageously, and preferably if there is any requirement to partially recycle the filtrate when filtering restarts, the feed valve 142 of the first filter may be opened slightly prior to the feed valve 142' of the second filter being closed, and the recycling valve 134 of the first filter may be opened when the feed valve 142' of the second filter is closed. This makes it possible to offset the filtrate recycling stage for the first filter 52 to before the end of the filtering stage of the second filter 52' so that the first filter can immediately start effective filtering when the second filter stops, thereby ensuring continuity in filtrate flow to the utilization.

Insofar as the installation does not include a decompression pipe, excessive accumulation of degassing air under the top cover 56 or 56' of the vats is prevented by connecting the degassing and balancing pipes 118 and 118' directly to the tops of the vats. The pipes 118 and 118' meet at their top ends in a common balancing pipe 118".

It may be observed that this installation comprises the exactly the same number of controlled valves as would be required for two independent installations of the above-described type. The person skilled in the art will readily understand that this represents a considerable saving given the very high cost of such valves.

In installations where the filtering stages are of very short duration, decompression pipes and the corresponding decompression valves will still have to be provided in order to shorten the emptying time of the balancing pipe and to ensure that the interrupted stage of one of the filters does not last for longer than the filtering stage of the other.

These decompression pipes and valves may be fairly small in diameter.

All of the above-described installations may precede other identical installations for the purpose of re-working the sludge produced by the preceding installation after said sludge has been diluted with a liquid which is less rich in solutes so as to methodically clean the sludge in this manner.

If necessary, a third filter installation and even a fourth may be provided in cascade with the filtrate produced by these installations being recycled downstream and serving to dilute sludge which contains liquid that is richer in solute than the recycled filtrate.

In all of the above, it has been assumed that the cake of accumulated solid aprticles is removed using the same liquid as the liquid being filtered.

This is not always possible, and for various reasons it may be necessary to remove the cake using a different liquid or no liquid at all. The problem which arises in this type of situation is that the cake which has soaked up different liquids, or the cake which has been allowed to drain, suffers from lateral contractions which give rise to cracks, and the cracks then provide preferential fluid flow paths for the backwash liquid, and as a result the cake is only partially loosened.

By virtue of the structure proposed herein for the filter elements in which the filter cloths are fitted over the filter leaves without being particularly stretched, thereby allowing them to follow lateral contractions of the cake freely, such cracks are not observed and the cake comes loose almost perfectly without requiring a large quantity of backwash liquid.

Figure 10:
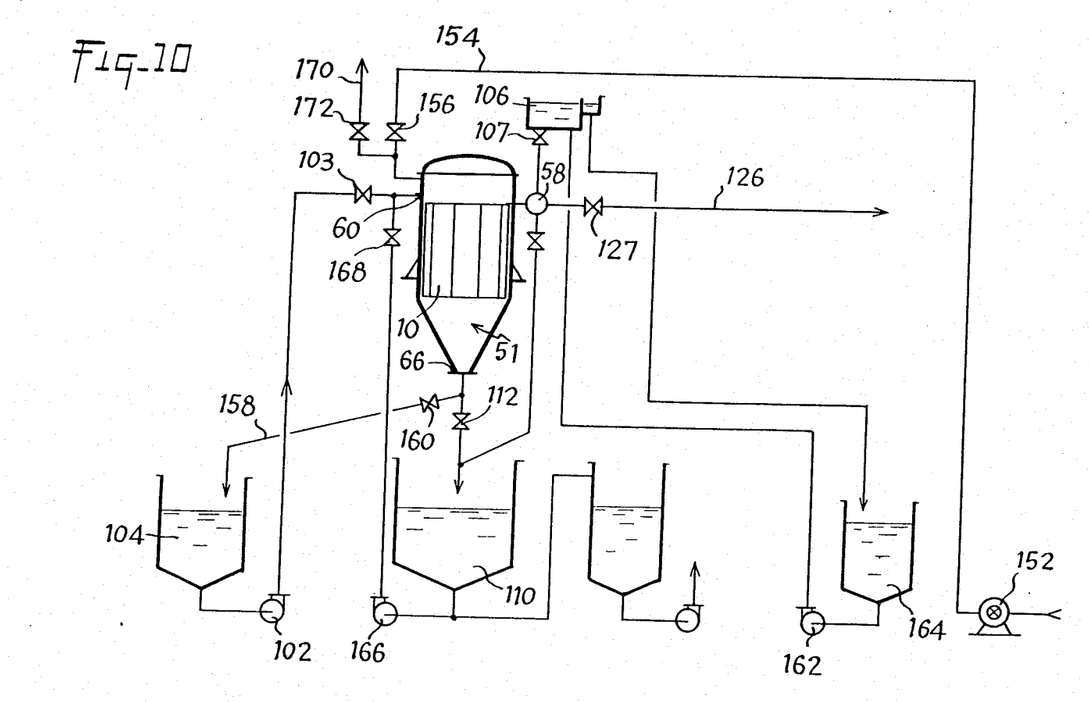

FIG. 10 shows an example of an installation in which the cake is removed using a liquid different from the liquid being filtered, and this installation is also capable of flushing filtrate using air.

As shown, the installation comprises an air compressor 152 feeding a pipe 154 which opens out into the vat close to the filter liquid feed orifice thereto, and which is under the control of a valve 156. The evacuation orifice 66 has a branch duct 158 under the control of a valve 160 running therefrom back to the feed tank 104.

The outlet manifold 58 may be put into communication either with a utilization duct 126 via a valve 127 or else with a buffer tank 106 containing a liquid other than the liquid to be filtered, via a valve 107.

By way of example, in order to filter carbonated syrups in sugar factories, the second liquid may advantageously be hot water. The buffer tank is fed, for example, by means of a pump 162 fed from a tank 164.

A recycling pump 166 has its inlet connected to the evacuation tank 110 for recycling the particle-laden liquid through the filter via the feed orifice and a controlled valve 168 for reasons which are explained below.

This installation operates in the following sequence:
(1) Filtering stage:
The feed pump is in operation, the feed valve 103 is open, the two valves 168 and 156 are closed, as is the evacuation valve 112 and the branch valve 160. The liquid passes through the filter cloth and the filtrate flows directly towards the utilization via the outlet manifold 58 and the valve 127.

(2) Phase for flushing the filtrate from the cake and the suspension contained in the vat:

The feed pump 102 is stopped and the feed valve 103 is closed. The air compressor 152 is switched on and the valve 156 is opened. The pressure of the compressed air flushes substantially all of the liquid present in the vat out through the filter cloths, and the pressure of the compressed air holds the filter cloths and the cakes of particles properly located against the filter leaves. The remaining liquid in the bottom of the vat is returned to the feed tank 106 via the branch duct 158 by opening the branch valve 160 and then closing it again, and the utilization valve 127 is also closed.

(3) Cake evacuation stage:

The supply of compressed air is maintained and the recycling pump 166 is started with the recycling valve 168 being opened. Thus, the compressed air is progressively replaced by liquid. The compressed air supply is switched off when the filter is full of recycled suspension, as is the recycling pump 166. Then, the outlet manifold is put into communication with the buffer tank 106 containing the second liquid and the return of this liquid through the filter cloth causes the cake to loosen and collect in the liquid recycled by the recycling pump.

After a certain period of time, the evacuation valve 112 is opened to remove the sludge constituted by the cake mixed in the recycled suspension from the filter.

The filtering stage is then restarted by restarting the feed pump 102 and opening the feed valve 103 and then putting the outlet manifold 58 back into communication with the utilization duct 126. Since the vat is initially filled with air, an escape duct 170 is provided with a valve 172 which is closed once the liquid level rises to the level of the exhaust inlet, thereby providing a cushion of air which ensures that the pressure rises progressively.

I claim:

1. A filter for liquids laden with solid particles, the filter comprising a filter vat provided with an inlet orifice for the liquid to be filtered, an outlet orifice for the filtered liquid or filtrate, and an evacuation orifice for solid particle sludge, together with a plurality of filter elements in the form of filter medium cloths disposed around filter leaves formed as rigid plates and arranged substantially vertically in said filter vat between said inlet and outlet orifices, said filter medium cloths being shaped as elongate pockets which are fitted substantially freely over said leaves, each of said filter leaves formed are rigid plates being provided with longitudinally-extending drainage channels, said pockets having openings directed upwardly and in communication with said outlet orifice, and suspension means attached to each of said filter leaves and to support members for suspending said leaves directly from and beneath said support members fixed in said vat and said suspension means being formed for rendering said leaves free to rock sideways.

2. A filter according to claim 1, wherein said cloths are folded and include mutually parallel lines of stiching with said pockets being defined therebetween.

3. A filter according to claim 1, wherein said filter leaves are made in the form of at least two corrugated sheets of solid metal or other material arranged in face to face contact with staggered corrugations wherein the widths of the leaves correspond to the widths of said pockets, and wherein said staggered corrugations of said sheets define drainage channels between said corrugations.

4. A filter according to claim 3, wherein said filter leaves are made by means of two corrugated sheets of metal or other material which are assembled or fastened back-to-back in such a manner as to define internal drainage channels and external drainage channels between their corrugations.

5. A filter according to claim 4, wherein the external channels are closed at their top ends by plugs.

6. A filter according to claim 3, wherein said means for suspending said filter leaves include cleats for suspending the top ends thereof from said support members, and wherein said support members include keyhole slots suitable for loosely receiving said cleats.

7. A filter according to claim 6, wherein said supports are in the form of tubular manifolds, with said slots constituting openings for passing liquid from the inside of said pockets to the inside of said tubular manifolds.

8. A filter according to claim 7, wherein said cloths include top margins which are pressed against said tubular manifolds by means of retaining plates.

9. A filter according to claim 7, wherein said manifold supports for said filter elements are placed substantially at the same level inside said vat, and at a predetermined distance below the top of said vat.

10. A filter according to claim 3, wherein said filter leaves include protective covers at their bottom ends.

11. A filter according to claim 10, wherein each of said protective covers is constituted by a V-shaped plate providing internal communication between internal drainage channels and external drainage channels in said filter leaves.

12. A filter according to claim 1, wherein said filter elements are disposed side-by-side inside said vat.

13. A filter according to claim 12, wherein said filter elements are disposed parallel to one another inside said vat.

14. A filter according to claim 12, wherein said filter elements are disposed inside said vat in a star configuration.

15. A filter according to claim 1, further including a decompression orifice whose inlet is situated above the filter elements.

16. A filter installation incorporating a filter according to claim 1, said installation comprising a feed tank for holding liquid to be filtered, said tank being situated at a lower level than the filter, a feed pump having its suction side connected to said feed tank and having its exhaust side connected to the inlet orifice of the filter, a buffer tank for the filtrate connected to said outlet orifice and situated at a higher level than the filter elements, a sludge-receiving tank fitted to said evacuation orifice via an evacuation valve, and a decompression pipe connecting the feed tank with a filter decompression orifice having its inlet situated above the filter elements, with a decompression valve being mounted in said decompression pipe.

17. A filter installation according to claim 16, wherein said filter vat includes a top cover whose height is chosen in such a manner as to trap a given volume of air in the top of the vat.

18. A filtering installation according to claim 17, including a leveling duct between the filter vat and the feed tank, said duct being controlled by a leveling valve and having its inlet situated at a level between the outlet from the inlet orifice and the inlet to the decompression orifice.

19. A filter installation according to claim 16, including a balancing pipe connected in parallel between the pump and the filter vat and rising to a height which is not less than the pump exhaust pressure, measured in terms of a column of liquid.

20. A filter installation according to claim 16, wherein said buffer tank includes an overflow pipe for connection to a utilization installation.

21. A filter installation according to claim 16, including a control box for sequentially controlling said decompression valve and said evacuation valve.

22. A filter installation according to claim 16, including an air compressor connected to said vat, a source of a second liquid other than the liquid to be filtered, and valve means for selectively draining said filtrate from said buffer tank, said source of a second liquid being connected to said buffer tank through an inlet thereto, said compressor being switched on when the feed pump is switched off in order to fill said vat with compressed air and remove the filtrate therefrom while maintaining the cakes of solid particles on the filter element cloths, said vat then being filled with said second liquid to replace the compressed air, and said second liquid being used for removing the particle cakes by backwashing through the filter cloths.

23. A filter installation according to claim 16, wherein the filter elements have manifold tubes at the tops thereof, and said manifold tubes are in communication with an outlet manifold situated outside the vat above the filter elements, and wherein said outlet manifold is of sufficient capacity to totally or partially replace said buffer tank.

24. A filter installation incorporating at least two filter systems connected in parallel, each said filter system including a filter according to claim 1, said filter systems having at least a common feed tank and feed pump for both filters, with a feed valve specific to each filter, with a buffer tank for each filter, and with a sludge-receiving tank common to both filters.

25. A filter installation according to claim 24, including a control box for sequentially controlling the feed valves and the evacuation valves included in both filters.

26. A filter installation incorporating at least two filter systems disposed in series and each including a filter according to claim 1 a first said filter system comprising a feed tank for holding liquid to be filtered, said tank being situated at a lower level than the filter, and each of said filter systems including a feed pump having its suction side connected to said feed tank and having its exhaust side connected to the inlet orifice of the filter, a buffer tank for the filtrate connected to said outlet orifice and situated at a higher level than the filter elements, and a decompression pipe connecting the feed tank with a filter decompression orifice having its inlet situated above the filter elements, with a decompression valve being mounted in said decompression pipe, said first filter system including a sludge-receiving tank fitted to said evacuation orifice via an evacuation valve, with the sludge-receiving tank associated with said first one of said filter systems constituting the feed tank for the second filter system.

27. A filter installation according to claim 26, wherein an outlet from the buffer tank is associated with the second filter and is connected to the feed tank associated with the first filter.

* * * * *